(12) United States Patent
Langton et al.

(10) Patent No.: US 9,953,164 B2
(45) Date of Patent: *Apr. 24, 2018

(54) CONFIRMING A MALWARE INFECTION ON A CLIENT DEVICE USING A REMOTE ACCESS CONNECTION TOOL, TO IDENTIFY A MALICIOUS FILE BASED ON FUZZ HASHES

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,676

(22) Filed: Mar. 9, 2017

(65) Prior Publication Data

US 2017/0177869 A1 Jun. 22, 2017

Related U.S. Application Data

(63) Continuation of application No. 14/675,274, filed on Mar. 31, 2015, now Pat. No. 9,594,906.

(51) Int. Cl.
*H04L 29/06* (2006.01)
*G06F 21/56* (2013.01)
*G06F 21/53* (2013.01)

(52) U.S. Cl.
CPC ............ *G06F 21/566* (2013.01); *G06F 21/53* (2013.01); *H04L 63/1416* (2013.01); *G06F 2221/034* (2013.01)

(58) Field of Classification Search
CPC ................................. G06F 21/56; G06F 21/53
USPC .......................................................... 726/23
See application file for complete search history.

(56) References Cited

U.S. PATENT DOCUMENTS 8,401,982 B1 * 3/2013 Satish ................... G06F 21/566
706/12
8,413,244 B1 * 4/2013 Nachenberg .......... H04L 63/145
713/188
8,495,747 B1 * 7/2013 Nakawatase .......... G06F 21/577
726/25

(Continued)

*Primary Examiner* — Haresh N Patel
(74) *Attorney, Agent, or Firm* — Harrity & Harrity, LLP (57) ABSTRACT

A device may receive a trigger to determine whether one or more client devices, of a set of client devices, are infected by a malicious file. The device may generate file identification information associated with the malicious file based on receiving the trigger to determine whether the one or more client devices are infected by the malicious file. The device may obtain remote access to the one or more client devices using a connection tool based on receiving the trigger to determine whether the one or more client devices are infected by the malicious file. The device may obtain information, associated with the one or more client devices, using the remote access. The device may provide information indicating whether the one or more client devices are infected by the malicious file based on the file identification information and the information associated with the one or more client devices.

20 Claims, 9 Drawing Sheets

(56) References Cited

U.S. PATENT DOCUMENTS

| | | | |
|---|---|---|---|
| 8,990,639 B1* | 3/2015 | Marr | G06F 11/30 |
| | | | 714/25 |
| 9,021,260 B1 | 4/2015 | Falk et al. | |
| 9,294,501 B2 | 3/2016 | Mesdaq et al. | |
| 9,405,905 B2 | 8/2016 | Sinclair et al. | |
| 9,594,906 B1 | 3/2017 | Langton et al. | |
| 2011/0067108 A1* | 3/2011 | Hoglund | G06F 21/554 |
| | | | 726/24 |
| 2011/0093426 A1* | 4/2011 | Hoglund | G06F 21/562 |
| | | | 706/52 |
| 2013/0046763 A1 | 2/2013 | Sinclair et al. | |
| 2013/0151562 A1* | 6/2013 | Fujii | G06F 17/30109 |
| | | | 707/780 |
| 2014/0165203 A1 | 6/2014 | Friedrichs et al. | |
| 2015/0096023 A1* | 4/2015 | Mesdaq | H04L 63/145 |
| | | | 726/23 |
| 2015/0121485 A1* | 4/2015 | Collins | H04L 41/0803 |
| | | | 726/5 |
| 2015/0220735 A1* | 8/2015 | Paithane | G06F 21/566 |
| | | | 726/23 |
| 2016/0004864 A1* | 1/2016 | Falk | G06F 21/56 |
| | | | 726/23 |
| 2016/0094564 A1 | 3/2016 | Mohandas et al. | |

* cited by examiner

CONFIRMING A MALWARE INFECTION ON A CLIENT DEVICE USING A REMOTE ACCESS CONNECTION TOOL, TO IDENTIFY A MALICIOUS FILE BASED ON FUZZ HASHES

RELATED APPLICATION

This application is a continuation of U.S. patent application Ser. No. 14/675,274, filed Mar. 31, 2015 (now U.S. Pat. No. 9,594,906), the disclosure of which is incorporated herein by reference.

BACKGROUND

A malicious file, such as malicious software ("malware"), may refer to any software used to disrupt computer operations, gather sensitive information, gain access to private computer systems, or the like. A malicious file may include a variety of types of hostile or intrusive software, including a computer virus, a worm, a Trojan horse, ransomware, spyware, adware, scareware, or other malicious software. A malicious file may occur in multiple, similar permutations and, when executed, execution results (e.g., running processes, generated files, generated registry keys, etc.) may be created in multiple, similar permutations.

Despite a malicious file being downloaded onto a particular client device, the client device may not become infected (e.g., the malicious file may not operate on the client device). For example, a user may download a virus configured for Windows-based computers onto a Linux-based computer. In another example, the user may download the virus and fail to execute the virus.

SUMMARY

According to some possible implementations, a device may receive a trigger to determine whether one or more client devices, of a set of client devices, are infected by a malicious file. A client device, of the set of client devices, may be infected by the malicious file when the malicious file was executed and/or is executing on the client device. The device may generate file identification information associated with the malicious file based on receiving the trigger to determine whether the one or more client devices are infected by the malicious file. The file identification information may include a set of fuzzy hashes associated with execution results of the malicious file. The device may obtain remote access to the one or more client devices using a connection tool based on receiving the trigger to determine whether the one or more client devices are infected by the malicious file. The connection tool may provide access to the one or more client devices. The device may obtain information, associated with the one or more client devices, using the remote access. The device may provide information indicating whether the one or more client devices are infected by the malicious file based on the file identification information and the information associated with the one or more client devices.

According to some possible implementations, a computer-readable medium may include one or more instructions that may cause one or more processors to generate file identification information associated with a malicious file to determine whether one or more client devices are infected by the malicious file. A client device, of the one or more client devices, may be infected by the malicious file when the malicious file was executed and/or is executing on the client device. The file identification information may include a set of fuzzy hashes associated with executing the malicious file. The one or more instructions may cause the one or more processors to obtain remote access to the one or more client devices using a connection tool to determine whether the one or more client devices are infected by the malicious file. The connection tool may provide access to the one or more client devices. The one or more instructions may cause the one or more processors to obtain information associated with the one or more client devices using the remote access. The one or more instructions may cause the one or more processors to provide information indicating whether the one or more client devices are infected by the malicious file based on the file identification information and the information associated with the one or more client devices.

According to some possible implementations, a method may include generating, by a device, file identification information associated with a malicious file to determine whether one or more client devices are infected by the malicious file. A client device, of the one or more client devices, may be infected by the malicious file when the malicious file was executed and/or is executing on the client device. The file identification information may include a set of fuzzy hashes associated with executing the malicious file in a testing environment. The method may include obtaining, by the device, remote access to the one or more client devices to determine whether the one or more client devices are infected by the malicious file. The method may include obtaining, by the device, information associated with the one or more client devices using the remote access. The method may include providing, by the device, information indicating whether the one or more client devices are infected by the malicious file based on the file identification information and the information associated with the one or more client devices.

DETAILED DESCRIPTION

The following detailed description of example implementations refers to the accompanying drawings. The same reference numbers in different drawings may identify the same or similar elements.

A malicious file may include a ransomware file, a spyware file, or the like. Often the malicious file may be downloaded to a client device when a user intends to download a legitimate file, such as a software program, a data file, or the like. For example, the user may download a legitimate (non-malicious) file and may inadvertently download a malicious file while downloading the legitimate file. The quickness with which a malicious file is remediated is important in minimizing damage caused by operation of the malicious file. However, the malicious file may not execute on each client device that downloads the malicious file. For example, the malicious file may not be compatible with a particular operating system of a client device, the malicious file may not be selected for execution by a user of a client device, or the like. Although the malicious file is present in a data structure of the client device, because the malicious file is not operating and/or has not operated on the client device, the client device may remain uninfected by the malicious file.

Moreover, when the malicious file is executed, it may cause multiple permutations of execution results (e.g., processes created during execution, registry keys generated during execution, or the like) on multiple client devices. For example, the malicious file may create a first registry key on a first client device and a second, similar but distinct registry key on a second client device. Implementations, described herein, may facilitate confirming whether a client device is infected by a malicious file using a set of fuzzy hashes to account for permutations of execution results on different client devices. In this way, malicious file remediation may be prioritized to client devices that are infected by the malicious file.

Figure 1:
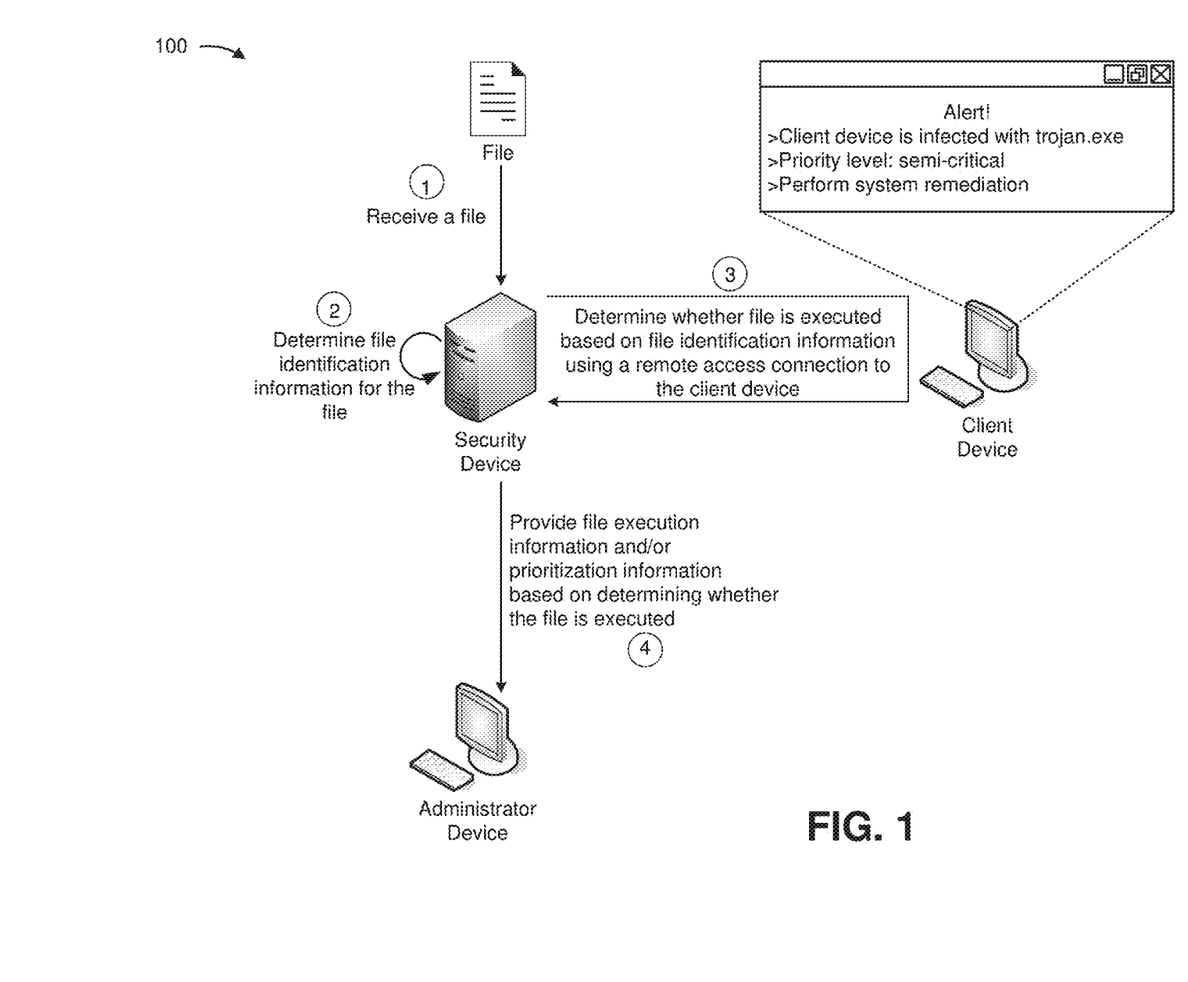
FIG. 1 is a diagram of an overview of an example implementation described herein.

FIG. 1 is a diagram of an overview of an example implementation 100 described herein. As shown by reference identifier 1, a security device may receive a file for a determination of file execution information (e.g., a determination of whether the file is executing/has executed on a client device). For example, the security device may receive the file, which is a malicious file, based on the file being downloaded to the client device. As shown by reference identifier 2, the security device may determine file identification information for the file. File identification information may refer to information associated with the file utilized to determine whether the file was executed/is executing on the client device. For example, the security device may cause the file to be executed in a testing environment and may identify execution results (e.g., a set of processes executing during/after the file was executed, a set of registry keys generated/modified during/after the file was executed, etc.). The security device may compute a set of fuzzy hashes associated with the file and/or the execution results. A fuzzy hash may refer to a particular hash, such as a computing context triggered piecewise hash (CTPH), that is associated with sequences of bytes of an element (e.g., a file, a registry key, a process, etc.), facilitating a match between two elements that are exactly the same, approximately the same, or the like. For example, the security device may generate a fuzzy hash for each process that operates in the testing environment when the file is executed in the testing environment.

As further shown in FIG. 1, and by reference identifier 3, the security device may obtain access to the client device to determine whether the file is executed based on the file identification information. For example, the security device may match a fuzzy hash of a process identified in the testing environment as being created by the file against fuzzy hashes of running processes on the client device. If the client device identifies a process on the client device with a fuzzy hash matching (e.g., within a threshold level of matching) the process identified in the testing environment, the security device may determine that the file was executed/is executing on the client device. The security device may generate file execution information associated with determining whether the file was executed/is executing on the client device. For example, the security device may generate file execution information indicating that the file was executed, that the file did not execute, that the file is currently executing, or the like.

As further shown in FIG. 1, and by reference identifier 4, the security device may provide the file execution information and/or prioritization information to an administrator device. For example, the security device may determine a prioritization for remediating the client device, relative to other client devices for which remediation is needed, based on whether the file was executed, and may provide an indication of the prioritization to the administrator device. Based on receiving the file execution information, the prioritization information, or the like, the administrator device may display an alert, a priority for remediating the client device, or the like for a user of the administrator device (e.g., an information technology (IT) agent). Additionally, or alternatively, the administrator device may cause a remediation action to be performed, the security device may cause a remediation action to be performed, or the like.

In this way, a security device may facilitate prioritizing remediation of client devices based on determining whether a file (e.g., a malicious file was executed on the client device) was executed or is executing on the client devices.

Figure 2:
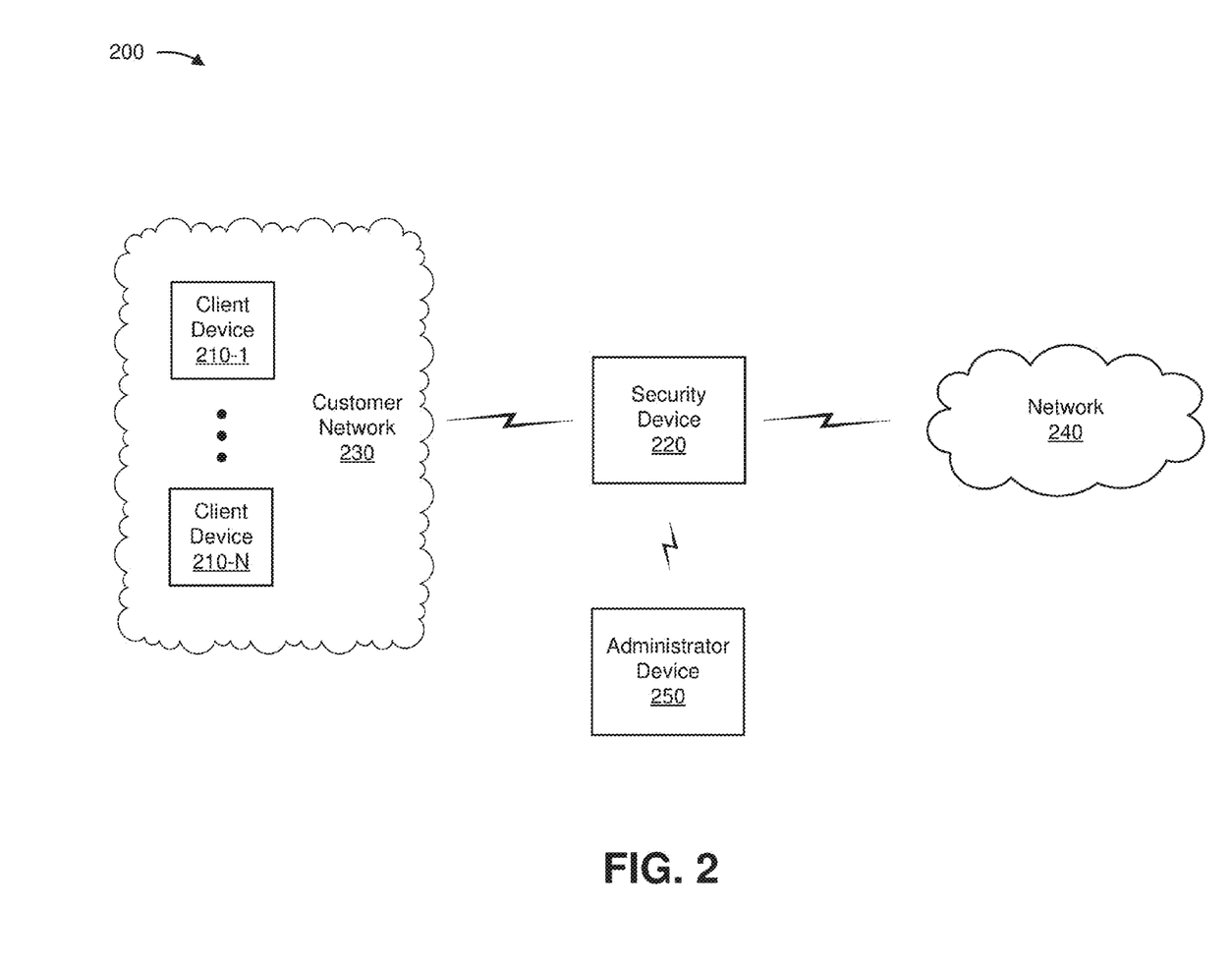
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, a network 240, and an administrator device 250. Devices of environment 200 may interconnect via wired connections, wireless connections, or a combination of wired and wireless connections.

Client device 210 may include one or more devices associated with a system configuration. For example, client device 210 may include a desktop computer, a laptop computer, a tablet computer, a mobile phone (e.g., a smart phone, a radiotelephone, etc.), a server, or a similar type of device. In some implementations, client device 210 may be capable of executing a malicious file, which may cause harm to client device 210, information stored by client device 210, a user of client device 210, and/or another client device 210. In some implementations, different client devices 210 may have different system configurations, and may be impacted by malicious files in different ways. For example, a first client device 210 may receive a malicious file and the malicious file may execute infecting the first client device 210 and a second client device 210 may receive the malicious file but the malicious file may fail to execute. Additionally, or alternatively, a first version of a registry key may be generated by the malicious file on first client device 210 and a second version of the registry key may be generated by the malicious file on second client device 210. In some implementations, client device 210 may reside on customer network 230.

Security device 220 may include one or more devices capable of processing and/or transferring network traffic associated with client device 210, and/or capable of remotely accessing client device 210 to perform a malicious file execution determination service. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may determine that a malicious file was executed/is executing on client device 210. For example, security device 220 may execute a malicious file in a testing environment (e.g., a sandbox environment), determine file identification information based on executing the malicious file in the testing environment (e.g., fuzzy hashes of processes running in the testing environment), and compare the file identification information to information associated with client device 210 to determine a match (the match indicating a particular likelihood that the malicious file was executed/is executing on client device 210).

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

Administrator device 250 may include one or more devices capable of performing monitoring for a network administrator, a system administrator, an IT agent, or the like. For example, administrator device 250 may include a computer, a server, a mobile device (e.g., a smartphone, a tablet computer, etc.), or the like. Administrator device 250 may receive information indicating that a malicious file is operating and/or has operated on a particular client device 210, and may cause an alert to be displayed for a user (e.g., the network administrator, the system administrator, the IT agent, etc.). In some implementations, administrator device 250 may cause a particular remediation action to be performed, may dispatch an IT agent to remediate a client device 210 on which the malicious file is operating, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
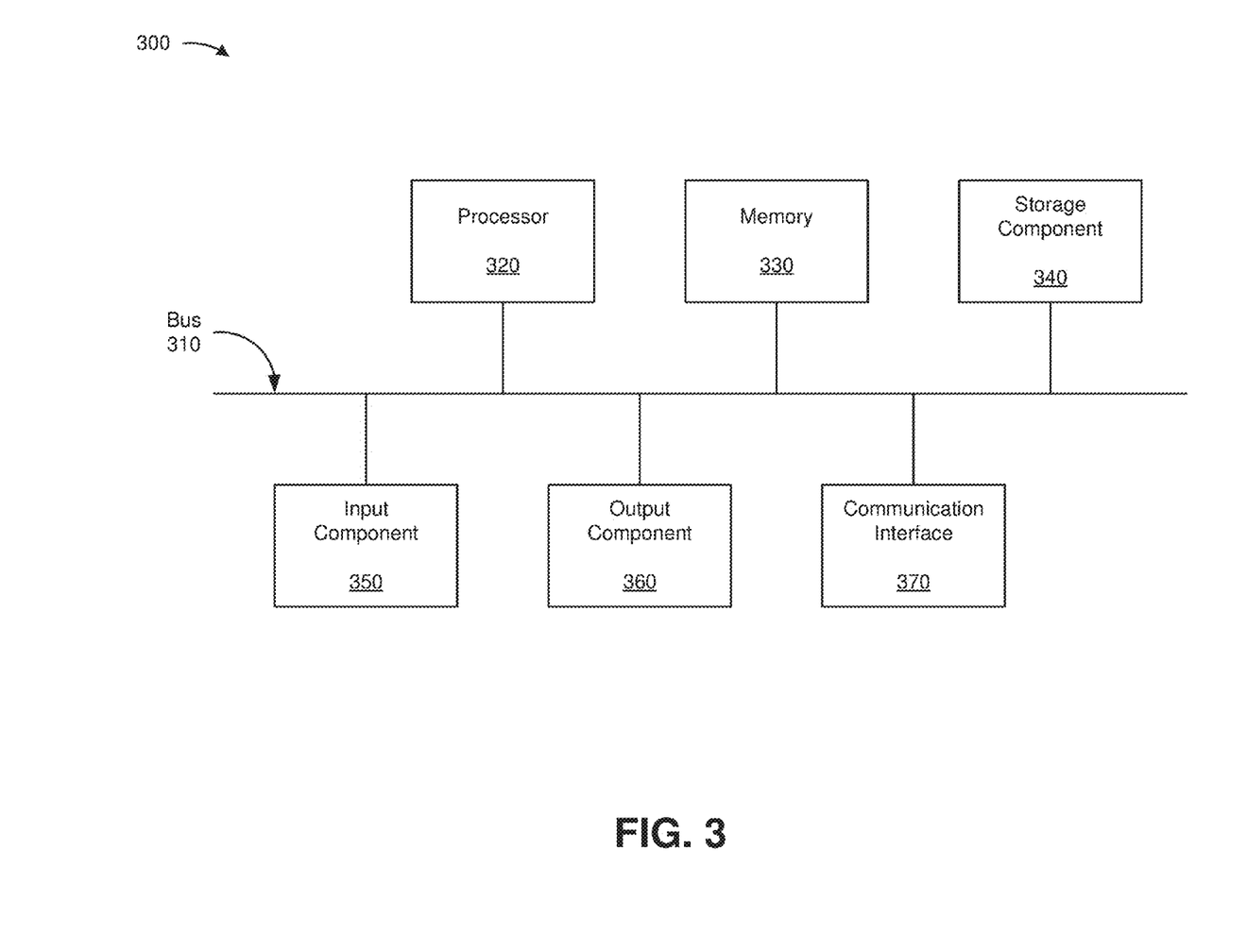
FIG. 3 is a diagram of example components of one or more devices of FIG. 2.

FIG. 3 is a diagram of example components of a device 300. Device 300 may correspond to client device 210, security device 220, and/or administrator device 250. In some implementations, client device 210, security device 220, and/or administrator device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
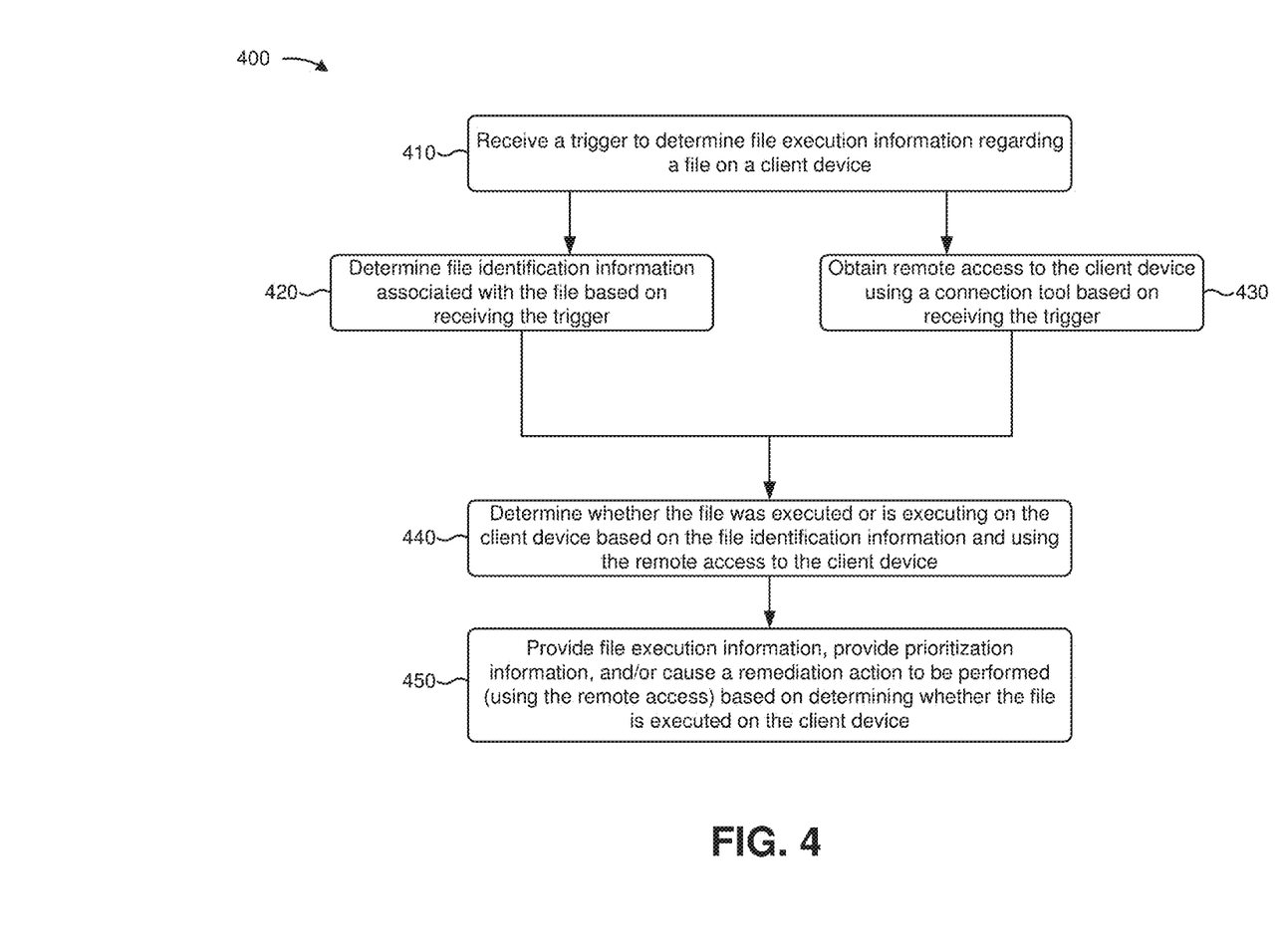
FIG. 4 is a flow chart of an example process for using remote access to a client device to determine whether the client device is infected by a malicious file.

FIG. 4 is a flow chart of an example process 400 for using remote access to a client device to determine whether the client device is infected by a malicious file. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include receiving a trigger to determine file execution information regarding a file on a client device (block 410). For example, security device 220 may receive the trigger to determine file execution information for the file on client device 210. File execution information may refer to information regarding whether a file was executed/is executing on client device 210. For example, when the file is a malicious file, the file execution information may indicate whether client device 210 is infected by the malicious file (e.g., the malicious file has executed/is executing on client device 210). In some implementations, security device 220 may receive the trigger based on monitoring network activity associated with a set of client devices 210. For example, when server device 220 monitors network activity associated with the set of client devices 210, server device 220 may determine that a file, downloaded by a particular client device 210, is a malicious file. In this case, server device 220 may be triggered to determine whether the particular client device 210 and/or another client device 210, of the set of client devices 210, is infected by the malicious file.

In some implementations, security device 220 may receive information, from another device (e.g., another security device 220, administrator device 250, or the like), instructing security device 220 to determine the file execution information. For example, another security device 220 may monitor a download of the file to client device 210, and may instruct security device 220 to determine file execution information for the file on client device 210. In some implementations, security device 220 may receive the trigger based on receiving information regarding a new malicious file. For example, when administrator device 250 identifies the new malicious file, administrator device 250 may instruct security device 220 to determine whether the new malicious file was executed/is executing on client device 210.

In some implementations, security device 220 may obtain information associated with the file when receiving the trigger. For example, security device 220 may obtain a copy of the file, information regarding the file (e.g., metadata associated with the file, a malicious purpose associated with the file, or the like), or the like when receiving the trigger. Metadata associated with the file may include information, such as a name of the file, a size of the file, a date the file was compiled or created, a company that compiled the file, a source of the file, or the like.

As further shown in FIG. 4, process 400 may include determining file identification information associated with the file based on receiving the trigger (block 420). For example, security device 220 may determine file identification information associated with the file. In some implementations, the file identification information may include information associated with execution results of the file (e.g., elements that are present when the file is executing and/or after the file is executed), such as processes, other files, registry keys, or the like that are created or accessed during execution of the file.

In some implementations, when determining file identification information, security device 220 may include execute the file in a testing environment (e.g., a sandbox environment). For example, security device 220 may cause the file to be executed in the testing environment. In some implementations, security device 220 may obtain information regarding other files created, modified, or accessed; registry keys created, modified, or accessed; processes running; or the like when the file is executed in the testing environment. For example, security device 220 may determine that a particular registry key is modified to a particular registry key value when the file is executed in the testing environment.

In some implementations, when determining the file information, security device 220 may generate a fuzzy hash of the information obtained when executing the file in the testing environment. For example, security device 220 may generate a fuzzy hash of each binary associated with a running process list generated during execution of the file in of the testing environment. Additionally, or alternatively, security device 220 may generate multiple fuzzy hashes for a particular element. For example, for a particular running process, security device 220 may generate multiple fuzzy hashes using multiple hashing techniques.

As further shown in FIG. 4, process 400 may include obtaining remote access to the client device using a connection tool based on receiving the trigger (block 430). For example, security device 220 may obtain access to client device 210 using a connection tool. A connection tool may refer to a module that grants, to a first device, a particular level of access to a second device, allowing the first device to perform one or more tasks on the second device. For example, the connection tool (e.g., an operating system interface tool) may provide remote access and control of client device 210, such as via an operating system interface for an operating system of client device 210 (e.g., a Windows-based operating system, a Linux-based operating system, etc.). Further to this example, the connection tool may include a Windows management instrumentation (WMI) based connection tool, such as PowerShell. In this case, security device 220 may utilize a connection tool to access an interface of WMI, operating on client device 210, to control a functionality of client device 210.

Additionally, or alternatively, the connection tool may include an endpoint agent installed on client device 210. An endpoint agent may be utilized when security device 220 lacks authorization credentials for client device 210, and the endpoint agent may be installed on client device 210 to facilitate access by security device 220. Similarly, WMI may be utilized when WMI is pre-configured on client device 210 and security device 220 includes authorization credentials for utilizing an interface of WMI to access client device 210 (e.g., to access file locations of client device 210, to perform operations on client device 210, to take control of client device 210, to cause remediation software to be executed on client device 210, or the like). In some implementations, security device 220 may receive authentication information including authorization credentials for client device 210 and may select a particular connection tool, of a set of connection tools, based on the authentication information.

Security device 220 may be granted access to different aspects of client device 210 and/or to perform different actions on client device 210, in some implementations. For example, security device 220 may be granted access to connect to client device 210, push a file onto client device 210, cause a file to be executed on client device 210, or the like. Additionally, or alternatively, security device 220 may be granted additional access to client device 210 (e.g., administrator level access) that permits security device 220 to scan a file system of client device 210, open a file, hash (e.g., fuzzy hash) a file, obtain a hash (e.g., a fuzzy hash) of a file, delete a file, modify a file, obtain information regarding a set of processes being operated on client device 210, manipulate a registry, determine registry information (e.g., query the registry, etc.), obtain user identification information regarding a set of users utilizing client device 210, modify a user access, lock a user access, alter a state of a network adapter, determine information associated with execution of a file (e.g., whether the file has been executed, whether the file is executing, etc.), or the like. In some implementations, aspects of client device 210 to which security device 220 is granted access may be selected based on credentials possessed by security device 220. For example, security device 220 may utilize a data structure storing an authorization credential (e.g., an administrator credential) for client device 210 to obtain administrator level access to client device 210.

As further shown in FIG. 4, process 400 may include determining whether the file was executed or is executing on the client device based on the file identification information and using the remote access to the client device (block 440). For example, security device 220 may use the remote access to client device 210 to obtain information regarding client device 210 and compare the information to the file identification information. In some implementations, security device 220 may use the remote access to locate the file on client device 210. For example, when security device 220 does not locate the file on client device 210, security device 220 may determine that the file is not executed on client device 210. Additionally, or alternatively, because a permutation of the file may prevent locating the file, security device 220 may determine whether the file is executed on client device 210 despite not locating the file on client device 210.

In some implementations, when determining whether the file is executed on client device 210, security device 220 may generate a set of fuzzy hashes associated with elements of client device 210. For example, security device 220 may use the remote access connection to obtain a process list (e.g., a set of running processes) for client device 210, and may compute a first set of fuzzy hashes based on processes of the process list. In this case, security device 220 may compare the first set of fuzzy hashes to a second set of fuzzy hashes of the file identification information (e.g., fuzzy hashes computed based on executing the file in the testing environment). Additionally, or alternatively, security device 220 may use the remote access connection to obtain a set of registry keys, a set of files, or the like for which a set of fuzzy hashes are computed and compare this setoff fuzzy hashes to fuzzy hashes of the file identification information.

In some implementations, security device 220 may determine a particular set of elements of client device 210 (e.g., files, registry keys, processes, etc.) to investigate as being related to execution of the file based on information regarding the file. For example, based on metadata associated with the file, security device 220 may identify one or more particular elements, such as one or more processes, files, registry keys, or the like, of client device 210, and may generate one or more fuzzy hashes for the one or more elements. In this case, security device 220 may determine whether the one or more fuzzy hashes correspond to one or more other fuzzy hashes generated based on execution results from the testing environment, thereby indicating that the file was executed on client device 210. Additionally, or alternatively, security device 220 may identify elements of the testing environment and determine whether fuzzy hashes of the elements of the testing environment correspond to other fuzzy hashes of elements on client device 210.

In some implementations, security device 220 may generate a similarity score that indicates a measure of similarity between information associated with the file in the testing environment (e.g., the file identification information) and information investigated on client device 210. For example, security device 220 may compare a set of fuzzy hashes generated based on executing the file in the testing environment to a set of fuzzy hashes generated based on elements of client device 210 to generate a similarity score (e.g., a quantity of similar fuzzy hashes, a quantity of identical fuzzy hashes, a percentage similarity, or the like). In this case, security device 220 may determine whether the file was executed/is executing on client device 210 based on the similarity score. For example, when the file is a malicious file, security device 220 may determine that client device 210 is infected based on the similarity score. In some implementations, security device 220 may determine that client device 210 is infected based on the similarity score satisfying a threshold.

In some implementations, security device 220 may generate file execution information when determining whether the file was executed on client device 210. For example, security device 220 may generate file execution information indicating that client device 210 is infected by the (malicious) file, not infected by the (malicious) file, or the like. Additionally, or alternatively, security device 220 may determine a confidence score for the determination of whether the client device 210 is infected by the (malicious) file. In some implementations, security device 220 may schedule client device 210 for further analysis when determining that the file is not executed on client device 210. For example, in a first scenario security device 220 may fail to match first fuzzy hashes associated with the testing environment to second fuzzy hashes associated with client device 210 when the file has not executed on client device 210. Further to the example, in a second scenario security device 220 may fail to match the first fuzzy hashes to the second fuzzy hashes when the file was executed/is executing on client device 210, but permutations of the malicious file differ beyond a threshold measure. Accordingly, security device 220 may determine to perform additional analysis to confirm whether a failure to match the first fuzzy hashes to the second fuzzy hashes was a result of the first scenario (e.g., the malicious file not executing on client device 210) or a result of the second scenario (e.g., the malicious file is executing on client 210 but differs beyond a threshold measure from another version of the malicious file that was executed in the testing environment).

In some implementations, security device 220 may generate a prioritization for a set of client devices 210 when determining whether any of the set of client devices 210 are infected by a malicious file. For example, when security device 220 determines whether a malicious file was executed on one or more client devices 210 of a set of client devices 210, security device 220 may prioritize remediation of the one or more client devices 210 above remediation of another client device 210 on which the malicious file downloaded but did not execute. Further to the example, security device 220 may prioritize the set of client devices 210 based on a confidence score for determining that client device 210 is infected, based on a quantity of fuzzy hash matches, based on a severity of the infection, based on a type of malicious file (e.g., a potential for damage caused by the malicious file), or the like.

In some implementations, security device 220 may determine a remediation action for client device 210 when determining that client device 210 is infected by a malicious file. For example, when security device 220 determines that the malicious file was executed on client device 210, security device 220 may select a remediation action associated with remediating any malicious effects of the malicious file, such as modifying registry keys, removing processes, or the like. Additionally, or alternatively, when security device 220 determines that the malicious file downloaded to client device 210 but client device 210 is not infected, security device 220 may utilize the file identification information and the remote access to locate the malicious file on client device 210 and remove the malicious file from client device 210 to prevent a future infection by the malicious file.

As further shown in FIG. 4, process 400 may include providing file execution information, prioritization information, and/or causing a remediation action to be performed (using the remote access) based on determining whether the file is executed on the client device (block 450). For example, security device 220 may provide file execution information (e.g., whether the file was executed on client device 210; when the file is a malicious file, whether client device 210 is infected by the malicious file; etc.) to administrator device 250. Additionally, or alternatively, when the file is a malicious file, security device 220 may provide prioritization information (e.g., prioritizing remediation of a set of client devices 210) to administrator device 250. Additionally, or alternatively, when the file is a malicious file, security device 220 may cause a particular remediation action to be performed on client device 210. For example, using the remote access to client device 210, security device 220 may cause the malicious file to be deleted from client device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of using remote access to a client device to determine whether the client device is infected by a malicious file.

Figure 5A:
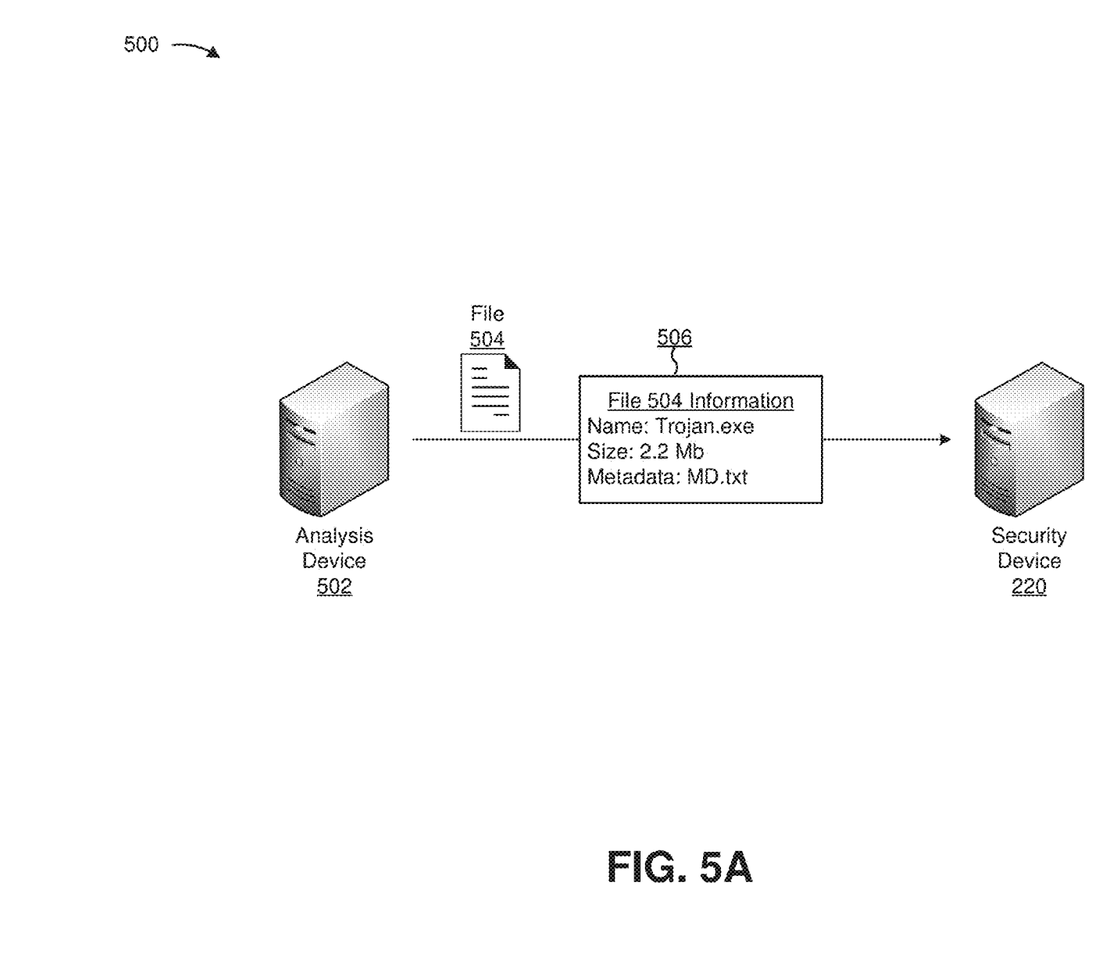
FIGS. 5A-5E are diagrams of an example implementation relating to the example process shown in FIG. 4.

As shown in FIG. 5A, analysis device 502 provides file 504 to security device 220. Analysis device 502 (e.g., a device associated with analyzing files received by client devices 210 to detect malicious files) provides, to security device 220, file information 506 regarding file 504, such as information identifying a name of file 504 (e.g., "Trojan.exe"), a file size for file 504, and metadata for file 504 (e.g., "MD.txt").

Figure 5B:
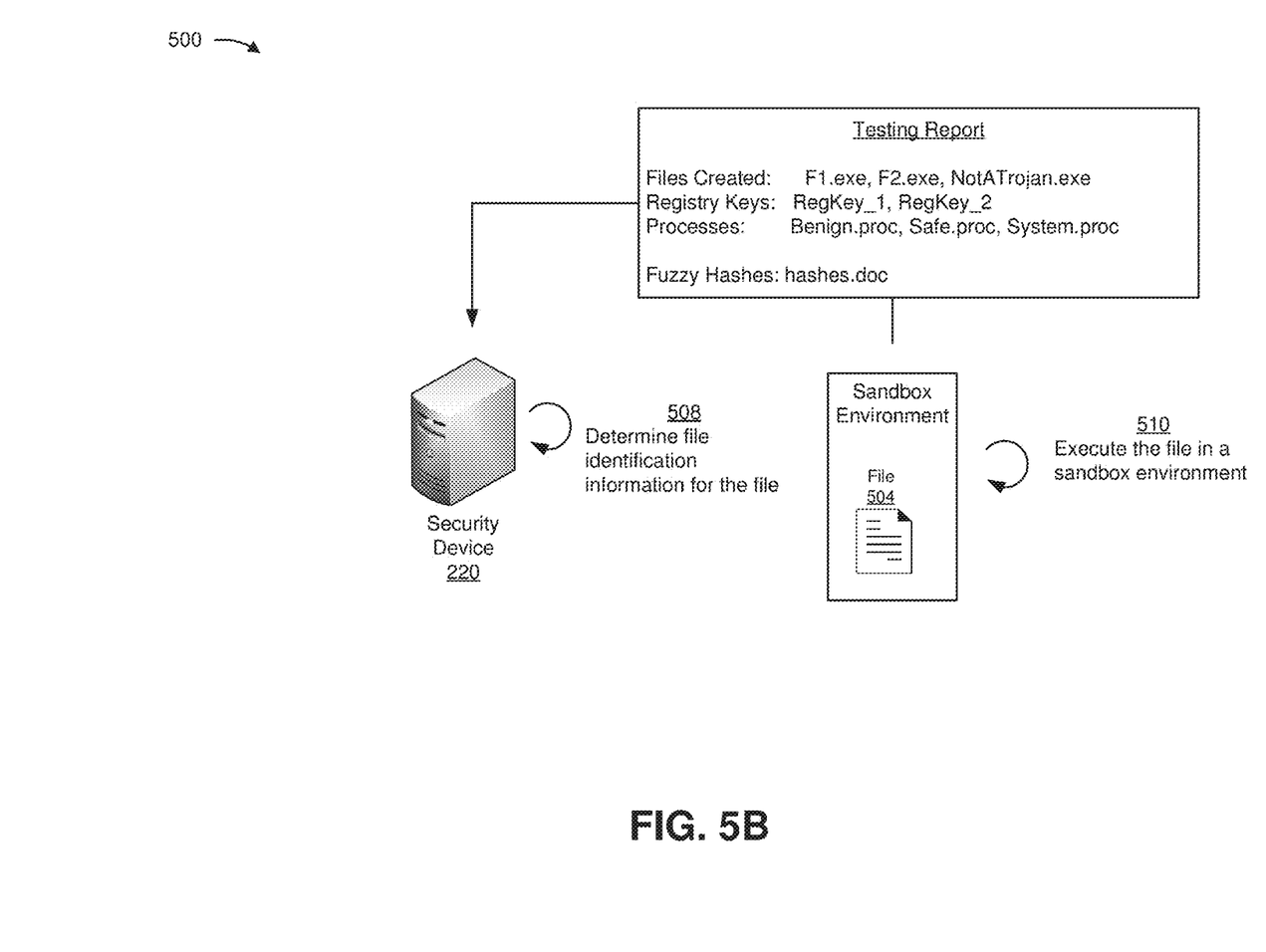

As shown in FIG. 5B, and by reference number 508, security device 220 determines file identification information for file 504 based on file 504 and file information 506. As shown by reference number 510, to generate the file identification information, security device 220 executes file 504 in a sandbox environment and generates a testing report. The testing report includes file identification information, such as information identifying files created during execution in the sandbox environment, registry keys modified during execution in the sandbox environment, processes operated during execution in the sandbox environment, and a set of fuzzy hashes associated therewith.

Figure 5C:
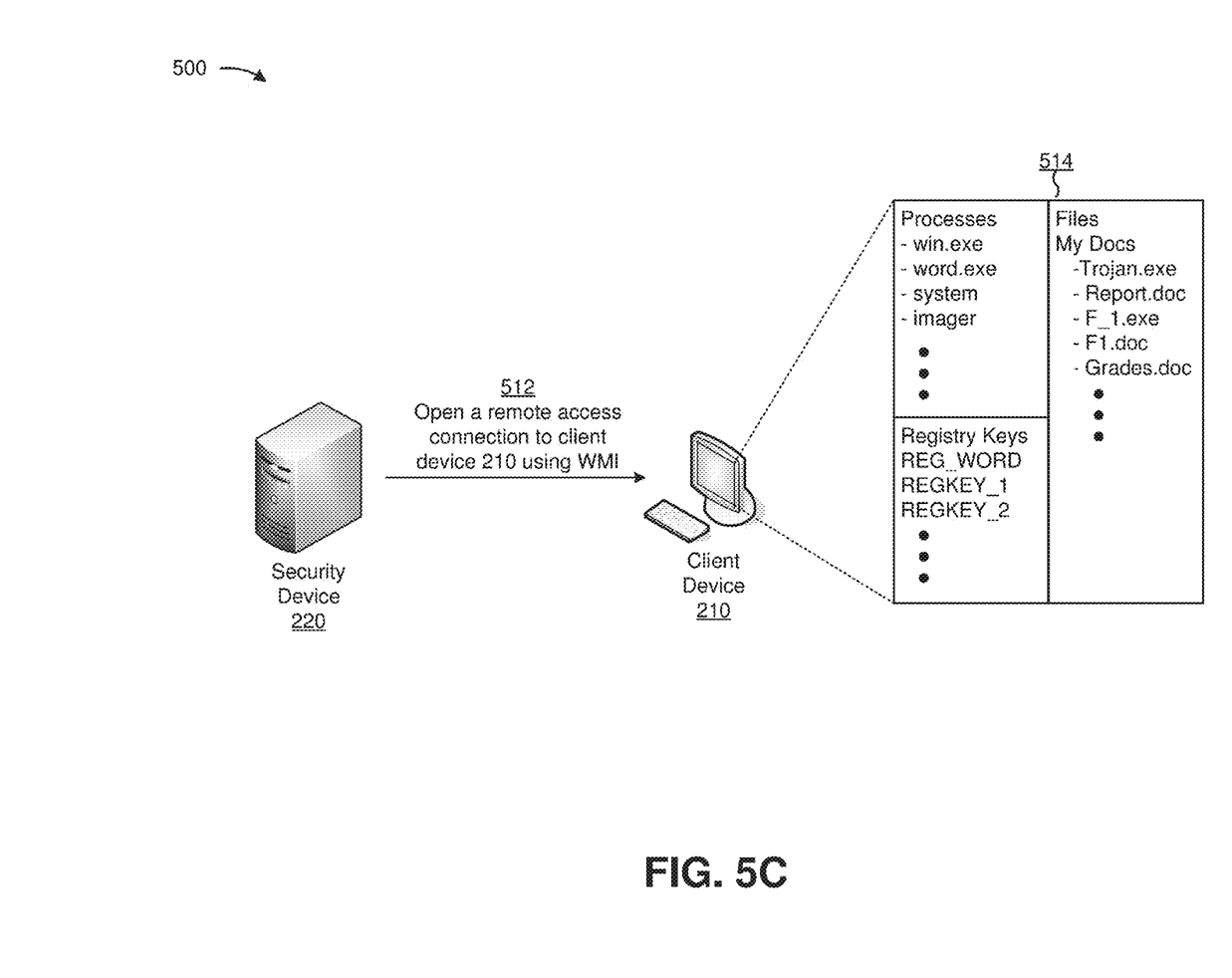

As shown in FIG. 5C, and by reference number 512, security device 220 opens a remote access connection to client device 210 using windows management instrumentation (WMI). As shown by reference number 514, using the remote access connection, security device 220 obtains information regarding processes operating on client device 210, registry keys of client device 210, files stored on client device 210, or the like.

Figure 5D:
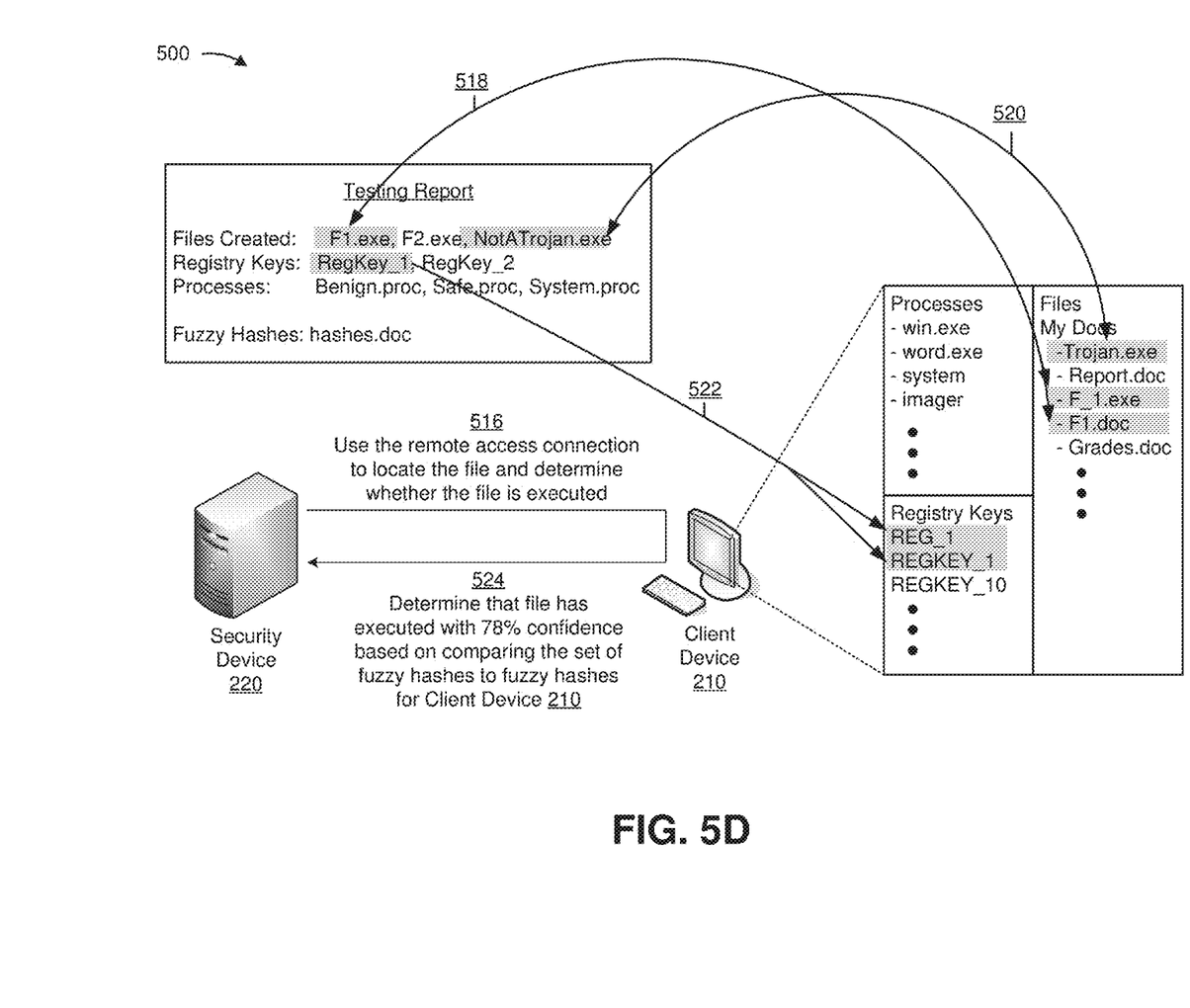

As shown in FIG. 5D, and by reference number 516, security device 220 uses the remote access connection to locate file 504 on client device 210 and determine whether file 504 is executed on client device 210. As shown by reference number 518, security device 220 matches a fuzzy hash for a file "F1.exe" in the testing report to fuzzy hashes for a first file "F_1.exe" and a second file "F1.doc" on client device 210. As shown by reference number 520, security device 220 matches a fuzzy hash for another file "NotATrojan.exe" in the testing report and a fuzzy hash for a third file "Trojan.exe" on client device 210. As shown by reference number 522, security device 220 matches a fuzzy hash for a registry key in the testing report "RegKey_1" to fuzzy hashes for a first registry key "REG_1" and a second registry key "REGKEY_1" on client device 210. As shown by reference number 524, based on matching multiple fuzzy hashes, security device 220 determines, with a particular confidence score (e.g., 78%), that file 504 is executed on client device 210.

Figure 5E:
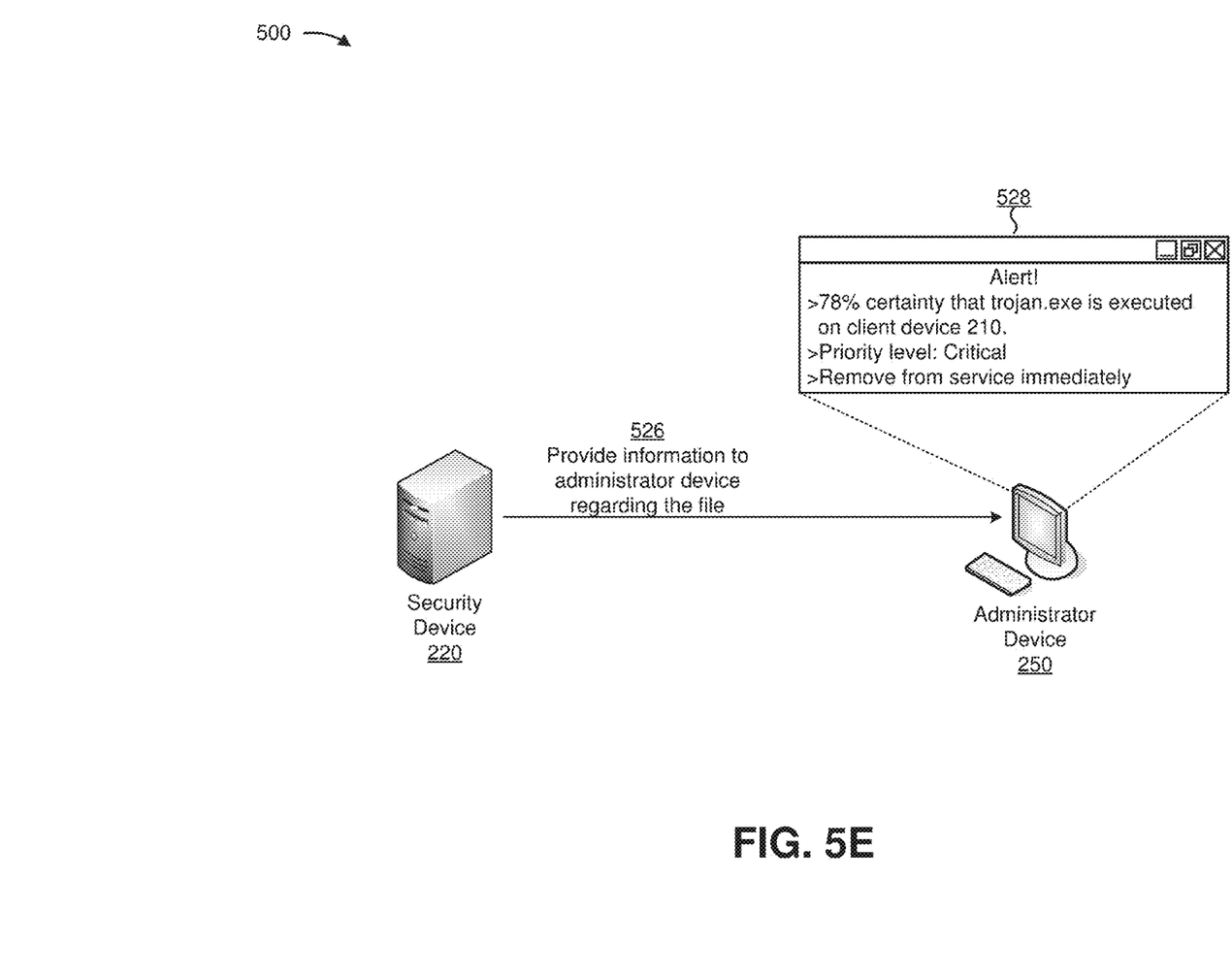

As shown in FIG. 5E, and by reference number 526, security device 220 provides information to administrator device 250 regarding the file, such as file execution information, prioritization information, or the like. As shown by reference number 528, administrator device 250 causes the alert to be displayed.

As indicated above, FIGS. 5A-5E are provided merely as an example. Other examples are possible and may differ from what was described with regard to FIGS. 5A-5E.

In this way, security device 220 may determine whether a (malicious) file was executed/is executing on client device 210 using an access connection to obtain information from client device 210 and a set of fuzzy hashes to account for permutations of execution results associated with executing the (malicious) file in a testing environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
     receive a trigger to determine whether one or more client devices, of a set of client devices, are infected by a malicious file;
     generate a first set of hashes based on executing the malicious file in a testing environment and receiving the trigger to determine whether one or more client devices, of the set of client devices, are infected by the malicious file;
     obtain information, associated with the one or more client devices and based on receiving the trigger, to determine whether the one or more client devices are infected by the malicious file,
       the information indicating at least one process running on the one or more client devices;
     generate one or more second sets of hashes associated with each of the one or more client devices, respectively, based on the at least one process running on the one or more client devices;
     generate a plurality of similarity scores,
       each of the plurality of similarity scores indicating a measure of similarity between the first set of hashes generated based on executing the malicious file in the testing environment and each of the one or more second sets of hashes generated based on the least one process running on the one or more client devices;
     determine, based on the plurality of similarity scores, that at least one of the one or more client devices is infected by the malicious file; and
     provide information indicating that the at least one of the one or more client devices is infected by the malicious file.

2. The device of claim 1, where the one or more processors, when receiving the trigger, are to:
   receive the trigger based on monitoring network activity associated with the one or more client devices.

3. The device of claim 1, where the one or more processors, when determining that the at least one of the one or more client devices is infected by the malicious file, are to:
   determine that the at least one of the one or more client devices is infected by the malicious file based on at least one similarity score, of the plurality of similarity scores, satisfying a threshold,
     the at least one similarity score corresponding to the at least one of the one or more client devices.

4. The device of claim 1, where at least one of the first set of hashes or the second sets of hashes comprises fuzzy hashes generated using a plurality of hashing techniques.

5. The device of claim 1, where the one or more processors are further to:
   determine a confidence score for the at least one of the one or more client devices based on file identification information and the information associated with the one or more client devices,
     the confidence score satisfying a threshold; and
   where the one or more processors, when providing the information indicating that the at least one of the one or more client devices is infected by the malicious file, are to:
     provide information indicating that the at least one of the one or more client devices is infected by the malicious file based on the confidence score satisfying the threshold.

6. The device of claim 1, where the one or more processors, when obtaining the information to determine whether the one or more client devices are infected by the malicious file, are to:
   obtain the information to determine whether the one or more client devices are infected by the malicious file after obtaining remote access using a connection tool.

7. The device of claim 6, where the one or more processors, when determining that the at least one of the one or more client devices is infected by the malicious file, are to:
   cause a remediation action to be performed using the connection tool based on determining that the at least one of the one or more client devices is infected by the malicious file.

8. A non-transitory computer-readable medium storing instructions, the instructions comprising:
   one or more instructions that, when executed by one or more processors, cause the one or more processors to:

receive a trigger to determine whether one or more client devices, of a set of client devices, are infected by a malicious file;

generate a first set of hashes based on executing the malicious file in a testing environment and receiving the trigger to determine whether one or more client devices, of the set of client devices, are infected by the malicious file;

obtain information, associated with the one or more client devices and based on receiving the trigger, to determine whether the one or more client devices are infected by the malicious file,
the information indicating at least one process running on the one or more client devices;

generate one or more second sets of hashes associated with each of the one or more client devices, respectively, based on the at least one process running on the one or more client devices;

generate a plurality of similarity scores,
each of the plurality of similarity scores indicating a measure of similarity between the first set of hashes generated based on executing the malicious file in the testing environment and each of the one or more second sets of hashes generated based on the at least one process running on the one or more client devices;

determine, based on the plurality of similarity scores, that at least one of the one or more client devices is infected by the malicious file; and provide information indicating that the at least one of the one or more client devices is infected by the malicious file.

9. The non-transitory computer-readable medium of claim 8, where the one or more instructions, that cause the one or more processors to receive the trigger, are to:
receive the trigger based on monitoring network activity associated with the one or more client devices.

10. The non-transitory computer-readable medium of claim 8, where the one or more instructions, that cause the one or more processors to determine that the at least one of the one or more client devices is infected by the malicious file, are to:
determine that the at least one of the one or more client devices is infected by the malicious file based on at least one similarity score, of the plurality of similarity scores, satisfying a threshold,
the at least one similarity score corresponding to the at least one of the one or more client devices.

11. The non-transitory computer-readable medium of claim 8, where at least one of the first set of hashes or the second sets of hashes comprises fuzzy hashes generated using a plurality of hashing techniques.

12. The non-transitory computer-readable medium of claim 8, where the one or more instructions, when executed by the one or more processors, further cause the one or more processors to:
determine a confidence score for the at least one of the one or more client devices based on file identification information and the information associated with the one or more client devices,
the confidence score satisfying a threshold; and
where the one or more instructions, that cause the one or more processors to provide the information indicating that the at least one of the one or more client devices is infected by the malicious file, are to:
provide information indicating that the at least one of the one or more client devices is infected by the malicious file based on the confidence score satisfying the threshold.

13. The non-transitory computer-readable medium of claim 8, where the one or more instructions, that cause the one or more processors to obtain the information to determine whether the one or more client devices are infected by the malicious file, are to:
obtain the information to determine whether the one or more client devices are infected by the malicious file after obtaining remote access using a connection tool.

14. The non-transitory computer-readable medium of claim 13, where the one or more instructions, that cause the one or more processors to determine that the at least one of the one or more client devices is infected by the malicious file, are to:
cause a remediation action to be performed using the connection tool based on determining that the at least one of the one or more client devices is infected by the malicious file.

15. A method, comprising:
receiving, by a device, a trigger to determine whether one or more client devices, of a set of client devices, are infected by a malicious file;

generating, by the device, a first set of hashes based on executing the malicious file in a testing environment and receiving the trigger to determine whether one or more client devices, of the set of client devices, are infected by the malicious file;

obtaining, by the device, information, associated with the one or more client devices and based on receiving the trigger, to determine whether the one or more client devices are infected by the malicious file,
the information indicating at least one process running on the one or more client devices;

generate one or more second sets of hashes associated with each of the one or more client devices, respectively, based on the at least one process running on the one or more client devices;

generating, by the device, a plurality of similarity scores,
each of the plurality of similarity scores indicating a measure of similarity between the first set of hashes generated based on executing the executing the malicious file in the testing environment and each of the one or more second sets of hashes generated based on the at least one process running on the one or more client devices;

determining, by the device and based on the plurality of similarity scores, that at least one of the one or more client devices is infected by the malicious file; and providing, by the device, information indicating that the at least one of the one or more client devices is infected by the malicious file.

16. The method of claim 15, where receiving the trigger comprises:
receiving the trigger based on monitoring network activity associated with the one or more client devices.

17. The method of claim 15, where determining that the at least one of the one or more client devices is infected by the malicious file comprises:
determining that the at least one of the one or more client devices is infected by the malicious file based on at least one similarity score, of the plurality of similarity scores, satisfying a threshold,
the at least one similarity score corresponding to the at least one of the one or more client devices.

18. The method of claim 15, where at least one of the first set of hashes or the second sets of hashes comprises fuzzy hashes generated using a plurality of hashing techniques.

19. The method of claim 15, further comprising:
 determining a confidence score for the at least one of the one or more client devices based on file identification information and the information associated with the one or more client devices,
 the confidence score satisfying a threshold; and
 where providing the information indicating that the at least one of the one or more client devices is infected by the malicious file comprises:
  providing information indicating that the at least one of the one or more client devices is infected by the malicious file based on the confidence score satisfying the threshold.

20. The method of claim 15, where obtaining the information to determine whether the one or more client devices are infected by the malicious file comprises:
 obtaining the information to determine whether the one or more client devices are infected by the malicious file after obtaining remote access using a connection tool.

\* \* \* \* \*